(12) United States Patent
Kurita

(10) Patent No.: US 6,282,978 B1
(45) Date of Patent: Sep. 4, 2001

(54) TILT-LOCK DEVICE FOR TILT-TYPE STEERING COLUMN

(75) Inventor: Haruhide Kurita, Shizuoka (JP)

(73) Assignee: Fuji Kiko Co., Ltd., Tokyo (JP)

( * ) Notice: Subject to any disclaimer, the term of this patent is extended or adjusted under 35 U.S.C. 154(b) by 0 days.

(21) Appl. No.: 09/409,084

(22) Filed: Sep. 30, 1999

(30) Foreign Application Priority Data

Oct. 9, 1998 (JP) .................................................. 10-287155

(51) Int. Cl.⁷ ....................................................... B62D 1/16
(52) U.S. Cl. ............................................. 74/493; 280/775
(58) Field of Search ................................ 74/493; 280/775

(56) References Cited

U.S. PATENT DOCUMENTS

| | | | |
|---|---|---|---|
| 5,117,707 | * 6/1992 | Kinoshita et al. | 74/493 |
| 5,199,319 | * 4/1993 | Fujiu | 74/493 |
| 5,338,064 | 8/1994 | Sadakata et al. | 280/775 |

FOREIGN PATENT DOCUMENTS 6-286621 10/1994 (JP) .

* cited by examiner

Primary Examiner—David A. Bucci
Assistant Examiner—William C Joyce
(74) Attorney, Agent, or Firm—Foley & Lardner

(57) ABSTRACT

A clamp is fixed to a robust portion of a vehicle body. The clamp is formed with spaced first side walls which define therebetween a recess for passing therethrough a jacket tube of a steering column. A distance bracket is formed with spaced second side wails which support thereon the jacket tube. The distance bracket is slidably movably disposed between the first side walls of the clamp in such a manner that outer surfaces of the second side walls are in contact with inner surfaces of the first side walls. Opening are formed in lower portions of the first and second side walls. A fastening bolt passes through the openings and has a threaded leading end projected outside of one of the first side walls. The fastening bolt is suppressed from rotation about its axis relative to the first side walls. A nut is operatively engaged with the threaded leading end of the fastening bolt. The nut forces the first side walls to incline toward each other when turned about the threaded leading end in a fastening direction. There is employed a means for lowering a possibility of producing a gap between each of the first side walls and each of the second side walls when the fist side walls are forced to incline toward each other.

6 Claims, 5 Drawing Sheets

TILT-LOCK DEVICE FOR TILT-TYPE STEERING COLUMN

BACKGROUND OF THE INVENTION

1. Field of the Invention

The present invention relates in general to a lock device for an automotive steering column and more particularly to a lock device for an automotive tilt-type steering column. More specifically, the present invention is concerned with a tilt-lock device by which the tilt-type steering column can be tightly and adjustably fixed to the vehicle body at a desired angle.

2. Description of the Prior Art

Hitherto, various lock devices for tilt-type steering columns have been proposed and put into practical use in the field of wheeled motor vehicles. With such lock devices, the tilt-type steering column can be fixed to the vehicle body at a desired angle to allow a driver to have an ideal driving posture.

In order to clarify the task of the present invention, one known lock device for the tilt-type steering column will be briefly described with reference to FIGS. 7 and 8 of the accompanying drawings, which is shown in Japanese Patent First Provisional Publication 6-286621. For ease of description, such lock device will be referred to as "tilt-lock device" in the following.

The tilt-type steering column shown in FIGS. 7 and 8 is of a lower-pivot type which has a lower portion pivotally connected to a lower part of a vehicle body and an upper portion detachably and adjustably fixed to the vehicle body through the tilt-lock device.

That is, as is seen from these drawings, the tilt-lock device comprises an upper clamp 3 which is secured to a robust structure of the vehicle body under a dashboard or the like. The upper clamp 3 is formed with two side walls 3a and 3b between which a generally rectangular recess 3c is defined. The rectangular recess 3c extends generally vertically. The side walls 3a and 3b are spaced from each other by the distance "A". Vertically slidably held by the upper clamp 3 is a distance bracket 5 which has side walls 5a and 5b intimately slidably engaged with inside surfaces of the side walls 3a and 3b of the upper clamp 3. For this sliding connection, the distance "B" between the side walls 5a and 5b of the distance bracket 5 is determined substantially the same as the distance "A". The side walls 5a and 5b are formed with inwardly bent support portions 5a' and 5b' for supporting and holding a jacket tube 2 of the steering column. As is seen from FIG. 8, the side walls 3a and 3b of the upper clamp 3 are formed with aligned elongate openings 6a and 6b (only 6a is shown) each extending vertically, while, as is seen from FIGS. 7 and 8, the side walls 5a and 5b of the distance bracket 5 are formed with aligned circular openings 7a and 7b is each having a diameter substantially equal to the width of the elongate openings 6a and 6b.

As is seen from FIG. 8, a tightening bolt 8 passes through the elongate and circular openings 6a, 6b, 7a and 7b which are aligned. Although not shown in the drawing, a nut is secured to the left side wall 3a (when viewed in the drawing) of the upper clamp 3, with which a threaded left end of the tightening bolt 8 is operatively engaged. Thus, when the tightening bolt 8 is turned about its axis in a fastening direction, the side walls 3a and 3b of the upper clamp 3 are forced to bend toward each other thereby to grip the distance bracket 5 therebetween tightly. With this, the jacket tube 2 of the steering column is tightly held by the tilt-lock device.

While, when the tightening bolt 8 is turned in an unfastening direction, the tight engagement between the distance bracket 5 and the upper bracket 3 becomes cancelled. Under this condition, the distance bracket 5 can be easily moved or pivoted up or down together with the jacket tube 2 by a degree determined by the length of the elongate openings 6a and 6b. That is, the steering column can be shifted or pivoted to a new angular position. Thereafter, the tightening bolt 8 is turned in the fastening direction. With this, the steering column is fastened to the vehicle body at the new angular position.

However, due to its inherent construction, the above-mentioned known tilt-lock device has the following drawbacks.

That is, as is seen from FIG. 8, when the tightening bolt 8 is turned in the fastening direction, the side walls 3a and 3b of the upper clamp 3 are forced to incline toward each other. However, such inclination of the side walls 3a and 3b tends to produce a wedge shaped gap "S" between each side wall 3a or 3b of the upper clamp 3 and the associated side wall 5a or 5b of the distance bracket 5. As is seen from the drawing, production of such gap "S" causes insufficient coupling between the upper clamp 3 and the distance bracket 5. In other words, as shown in the drawing, due to production of such gap "S", the practical distance "H" between the upper clamp 3 and the distance bracket 5 becomes large because actually these two parts are connected to each other at their mutually contacting portions which are pressed against each other by the tightening bolt 8, which induces a poor grasping of the jacket tube 2. In fact, such insufficient coupling brings about a higher possibility of transmitting undesired engine vibration to a steering wheel (not shown) mounted on the steering column, which gives the driver an unpleasant feeling. Furthermore, such insufficient coupling tends to produce noises particularly when the tilt-lock device is used for a long time.

SUMMARY OF THE INVENTION

It is therefore an object of the present invention to provide a tilt-lock device for a tilt-type steering column, which is free of the above-mentioned drawbacks.

According to a first aspect of the present invention, there is provided a tilt-lock device for a tilt-type steering column of a motor vehicle, which comprises a clamp adapted to be fixed to a body of the motor vehicle, the clamp being formed with spaced first side walls which define therebetween a recess for passing therethrough a jacket tube of the steering column; a distance bracket formed with spaced second side walls which support thereon the jacket tube, the distance bracket being slidably movably disposed between the first side walls of the clamp in such a manner that outer surfaces of the second side walls are in contact with inner surfaces of the first side walls; openings formed in lower portions of the first and second side walls; a fastening bolt passing through the openings and having a threaded leading end projected outside of one of the first side walls, the fastening bolt being suppressed from rotation about its axis relative to the first side walls; a nut operatively engaged with the threaded leading end of the fastening bolt, the nut forcing the first side walls to incline toward each other when turned about the threaded leading end in a fastening direction; and means for lowering a possibility of producing a gap between each of the first side walls and each of the second side walls when the fist side walls are forced to incline toward each other.

According to a second aspect of the present invention, there is provided a tilt-lock device for a tilt-type steering column of a motor vehicle, which comprises a clamp adapted to be fixed to a body of the motor vehicle, the clamp being formed with spaced first side walls which define therebetween a rectangular recess for passing therethrough a jacket tube of the steering column; a distance bracket formed with spaced second side walls and inwardly bent support portions which support thereon the jacket tube, the distance bracket being slidably movably disposed between the first side walls of the clamp in such a manner that outer surfaces of the second side walls are in contact with inner surfaces of the first side walls; elongate openings respectively formed in lower portions of the first side walls, which are aligned; circular openings respectively formed in lower portions of the second side walls, which are aligned; a fastening bolt passing through the elongate and circular openings and having a threaded leading end projected outside of one of the first side walls; a nut operatively engaged with the threaded leading end of the fastening bolt, the nut forcing the first side walls to incline toward each other when turned about the threaded leading end in a fastening direction; and a lock lever fixed to the nut to rotate therewith, wherein when the distance bracket is applied with substantially no stress, the distance between upper ends of the second side walls is substantially equal to the distance between the first side walls and greater than the distance between lower ends of the second side walls.

According to a third aspect of the present invention, there is provided a tilt-lock device for a tilt-type steering column of a motor vehicle, which comprises a clamp adapted to be fixed to a body of the motor vehicle, the clamp being formed with spaced first side walls which define therebetween a rectangular recess for passing therethrough a jacket tube of the steering column; a distance bracket formed with spaced second side walls whose upper ends are welded to the jacket tube, the distance bracket being slidably movably disposed between the first side walls of the clamp in such a manner that outer surfaces of the second side walls are in contact with inner surfaces of the first side walls; elongate openings respectively formed in lower portions of the first side walls, which are aligned; circular openings respectively formed in the second side walls, which are aligned; a fastening bolt passing through the elongate and circular openings and having a threaded leading end projected outside of one of the first side walls; a nut operatively engaged with the threaded leading end of the fastening bolt, the nut forcing the first side walls to incline toward each other when turned about the threaded leading end in a fastening direction; and a lock lever fixed to the nut to rotate therewith, wherein when the jacket tube and the distance bracket are applied with substantially no stress, the outer diameter of the jacket tube is substantially equal to the distance between the first side walls and greater than the distance between lower ends of the second side walls.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 4, there is shown a tilt-lock device 100A which is a first embodiment of the present invention.

Figure 1:
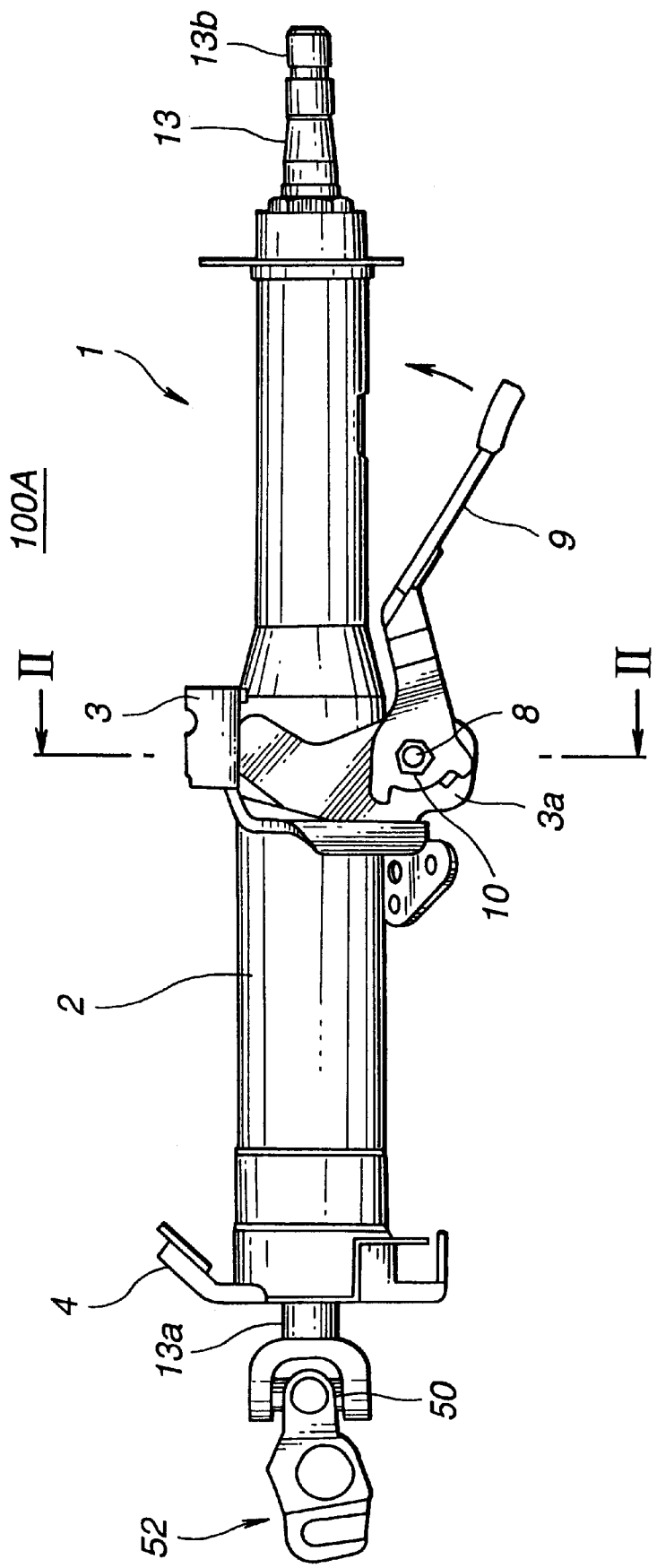
FIG. 1 is a side view of a tilt-type steering column to which a tilt-lock device of a first embodiment of the present invention is practically applied.

As is best seen from FIG. 1, the tilt-lock device 100A is applied to a tilt-type steering column 1 which generally comprises a jacket tube 2 and a steering shaft 13. The steering shaft 13 passes through the jacket tube 2 and includes a lower projected end 13a connected through a universal joint 50 to a steering mechanism 52 of a motor vehicle and an upper projected end 13b having a steering wheel (not shown) connected thereto. A lower portion of the jacket tube 2 is movably held by a lower clamp 4 fixed to the vehicle body.

A middle portion of the jacket tube 2 is adjustably held by the tilt-lock device 100A of the invention in such a manner as will be described in the following.

Figure 2:
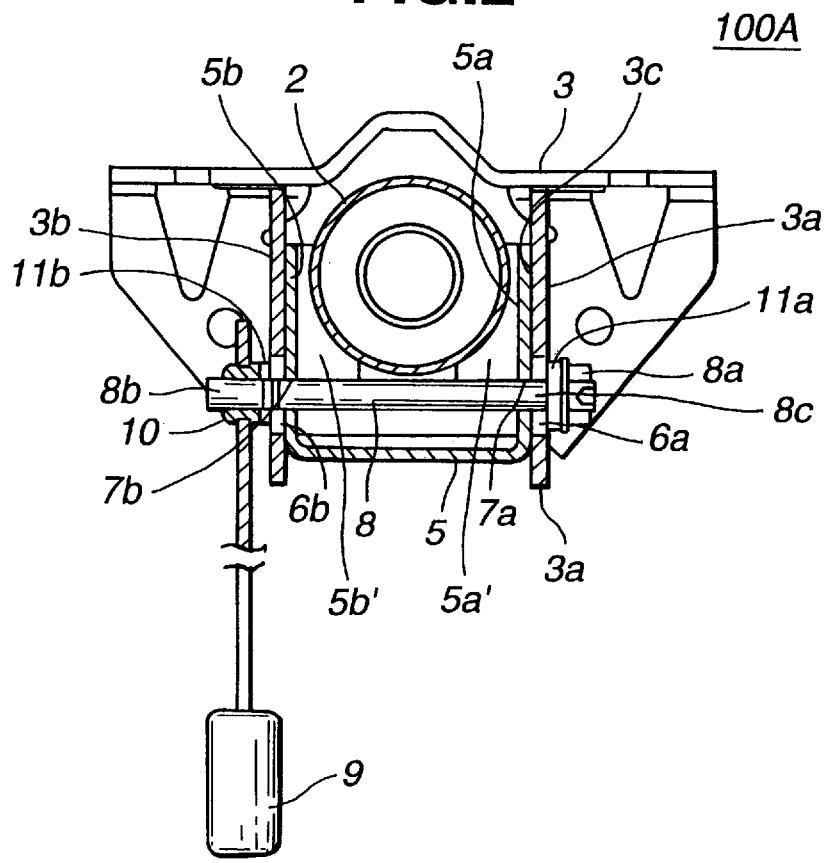
FIG. 2 is an enlarged sectional view taken along the line II—II of FIG. 1.

As is seen from FIGS. 1 and 2, the tilt-lock device 100A comprises an upper clamp 3 which is secured to a robust structure of the vehicle body. Slidably movably held by the upper clamp 3 is a distance bracket 5 which holds the jacket tube 2 of the steering column.

Similar to the above-mentioned known tilt-lock device, the upper clamp 3 is formed with two side walls 3a and 3b between which a generally rectangular recess 3c is defined. The rectangular recess 3c extends generally vertically.

As is seen from FIG. 2, vertically slidably held between the two side walls 3a and 3b of the upper clamp 3 is the distance bracket 5. The distance bracket 5 has side walls 5a and 5b intimately slidably engaged with inner surfaces of the side walls 3a and 3b of the upper clamp 3. The side walls 5a and 5b of the distance bracket 5 are formed with inwardly bent support portions 5a' and 5b' for supporting and holding the middle portion of the jacket tube 2 of the steering column. If desired, the support portions 5a' and 5b' may be welded to the jacket tube 2.

The side walls 3a and 3b of the upper lamp 3 are formed with aligned elongate openings 6a and 6b each extending vertically, while, the side walls 5a and 5b of the distance bracket 5 are formed with aligned circular openings 7a and 7b each having a diameter substantially equal to the width of the elongate openings 6a and 6b.

A tightening bolt 8 passes through in order the elongate opening 6a, the circular opening 7a, the other circular opening 7b and the other elongate opening 6b, which are aligned.

As shown in FIG. 2, the tightening bolt 8 includes a projected right end 8a which constitutes an enlarged head and a projected left end 8b which has a nut 10 operatively engaged therewith. Between the bolt head 8a and the right side wall 3a of the upper clamp 3 and between the nut 10 and the left side wall 3b of the upper clamp 3, there are disposed washers 11a and 11b respectively. It is to be noted that the fastening bolt 8 has a non-cylindrical part 8*c* slidably engaged with opposed side walls of the elongate opening 6*a* of the right side wall 3*a* of the upper clamp 3. With this engagement, the fastening bolt 8 is suppressed from rotation about an axis thereof.

A lock lever 9 is fixed to the nut 10 to rotate therewith. Thus, when the lock lever 9 is manipulated to turn the fastening bolt 8 in a fastening direction, the side walls 3*a* and 3*b* of the upper clamp 3 are forced to bend toward each other thereby to grip the distance bracket 5 therebetween.

According to the present invention, the following unique measures is employed.

Figure 3:
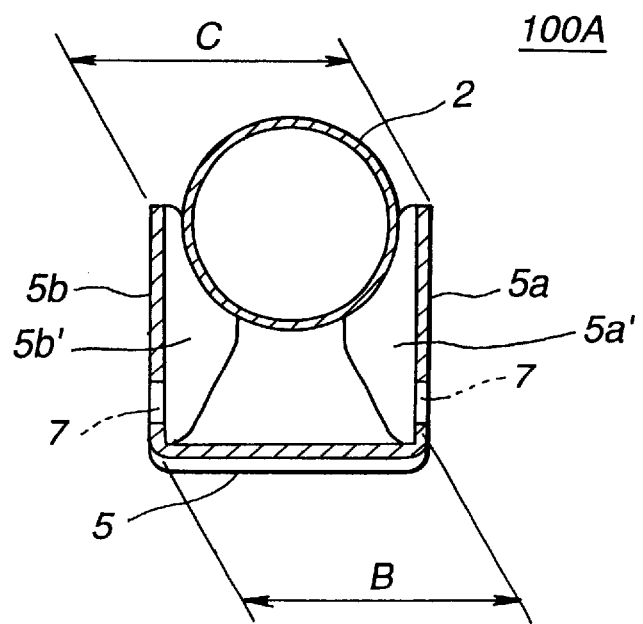
FIG. 3 is a sectional view of a distance bracket employed in the tilt-lock device of the first embodiment.
Figure 4:
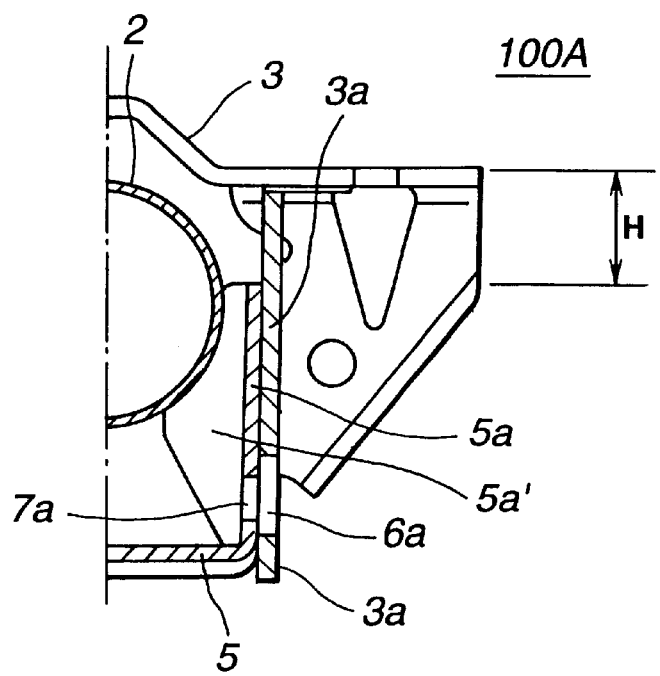
FIG. 4 is a right-half sectional view of the tilt-lock device of the first embodiment, showing an ideal coupling between the distance bracket and an upper clamp.

That is, as is seen from FIGS. 3 and 4, when the distance bracket 5 is kept dismantled from the upper clamp 3, that is, when the distance bracket 5 is kept applied with no stress, the distance "C" between upper ends of the side walls 5*a* and 5*b* is substantially equal to the distance between inner surfaces of the side walls 3*a* and 3*b* of the upper clamp 3 and greater than the distance "B" between lower ends of the side walls 5*a* and 5*b*.

That is, the distance bracket 5 is so produced or pressed as to establish the following inequality:

$$C > B \tag{1}$$

Figure 8:
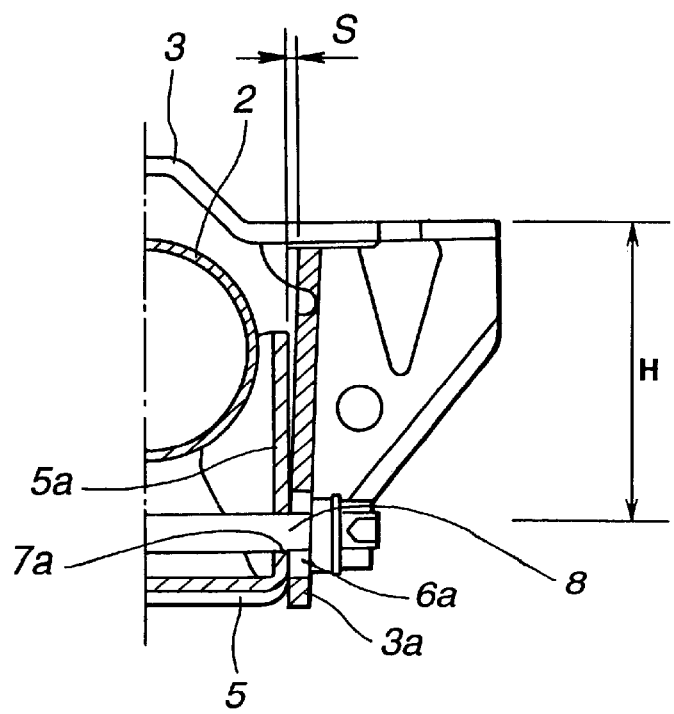
FIG. 8 is a right-half sectional view of the known tilt-lock device in an assembled condition.
Figure 7:
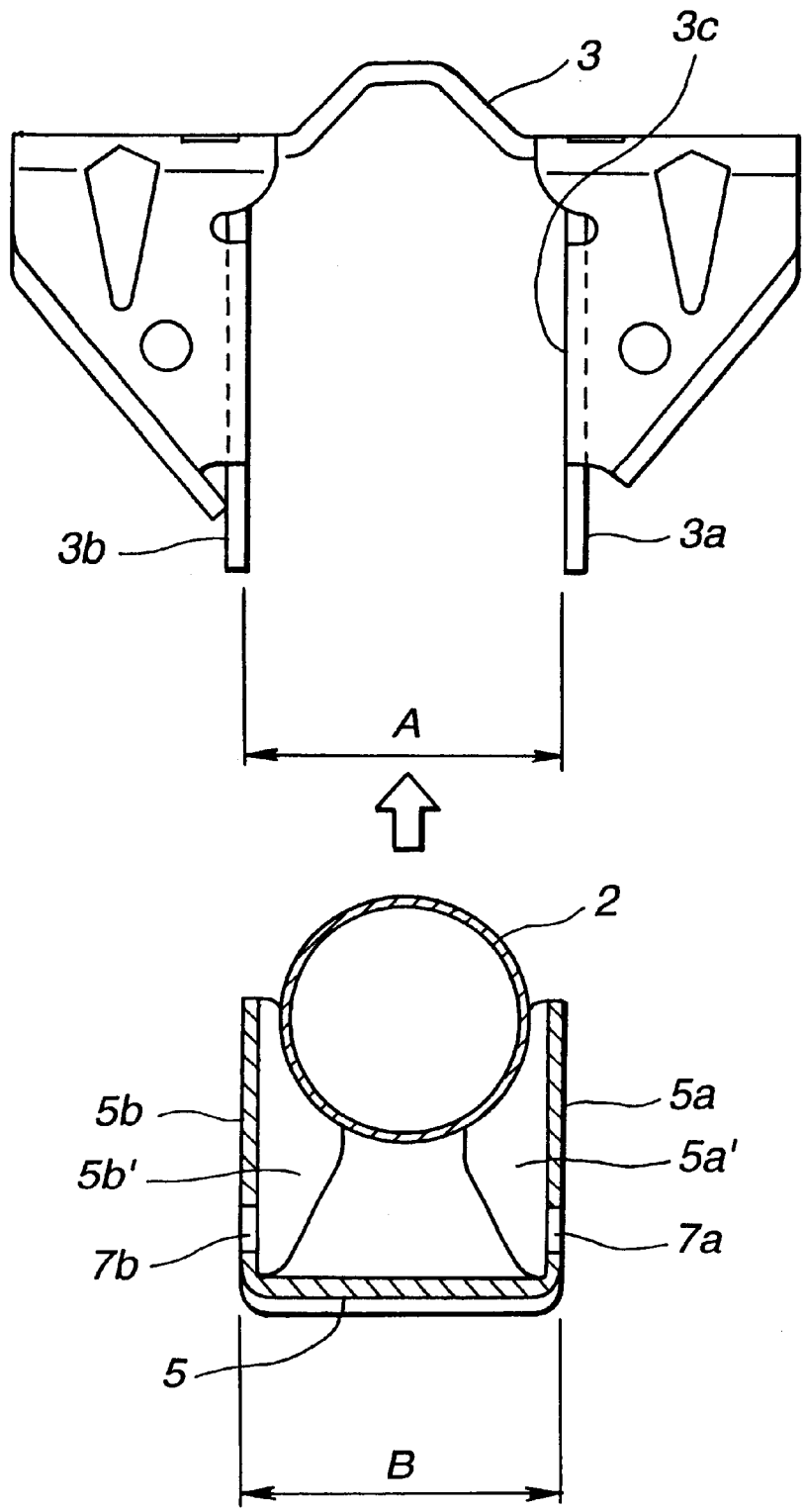
FIG. 7 is a partially sectional exploded view of a known tilt-lock device for a tilt-type steering column.

Thus, as is understood from FIGS. 2 and 4, when, due to manipulation of the lock lever 9 in the fastening direction, the side walls 3*a* and 3*b* of the upper clamp 3 are inclined toward each other, the inner surface of each side wall 3*a* or 3*b* of the upper clamp 3 can entirely contact with the outside surface of the associated side wall 5*a* or 5*b* of the distance bracket 5 without producing or leaving the above-mentioned undesired wedge shaped gap "S" therebetween. That is, as is seen from FIG. 4, the practical distance "H" between the upper clamp 3 and the distance bracket 5 becomes very small, because each side wall 3*a* or 3*b* of the upper clamp 3 and the corresponding side wall 5*a* or 5*b* of the distance bracket 5 are entirely and evenly pressed against each other by the tightening bolt 8. Thus, a tight coupling is established between the upper clamp 3 and the distance bracket 5 unlike the case of the above-mentioned known tilt-lock device of FIG. 8. Thus, the undesired engine vibration transmission to the steering wheel and the production of noises are suppressed or at least minimized.

Of course, when the lock lever 9 is turned in an unfastening direction, the tight coupling between the upper clamp 3 and the distance bracket 5 becomes cancelled and thus the steering column can be easily moved or pivoted to a new angular position. Thereafter, the lock lever 9 is turned in the fastening direction to lock the steering column at the new angular position.

Figure 5:
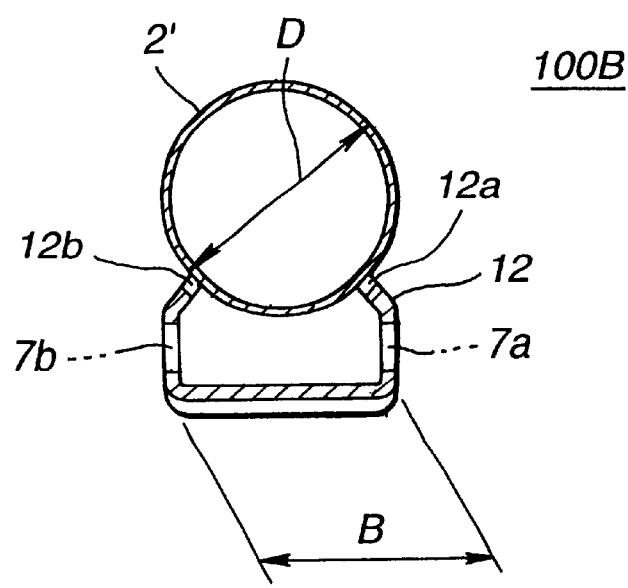
FIG. 5 is a sectional view of a modified distance bracket which is employed in a tilt-lock device of a second embodiment of the present invention.
Figure 6:
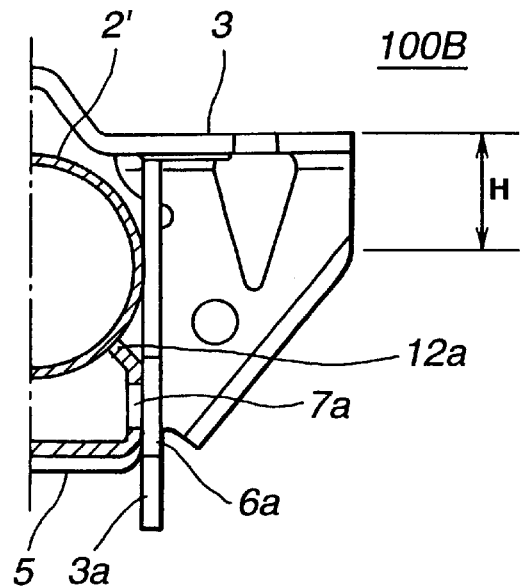
FIG. 6 is a view similar to FIG. 4, but showing an ideal coupling between the modified distance bracket and the upper clamp, which is established in the second embodiment.

Referring to FIGS. 5 and 6, particularly FIG. 6, there is shown a tilt-lock device 100B of a second embodiment of the present invention.

In this embodiment 100B, a modified distance bracket 12 is employed and a bracket tube 2' of the steeling column has an outer diameter "D" larger than that of the bracket tube 2 employed in the above-mentioned first embodiment 100A.

That is, the modified distance bracket 12 has no structure corresponding to the above-mentioned side walls 5*a* and 5*b* of the distance bracket 5 between which the jacket tube 2 is arranged. As shown, the modified distance bracket 12 has two raised ridges (or side walls) 12*a* and 12*b* whose upper ends are welded to the jacket tube 2'. The raised ridges 12*a* and 12*b* are formed with aligned circular openings 7*a* and 7*b*. It is to be noted that the outer diameter "D" of the jacket tube 2' is substantially equal to the distance between inner surfaces of the side walls 3*a* and 3*b* of the upper clamp 3 and greater than the distance "B" between lower ends of the raised ridges 12*a* and 12*b*. That is, the following inequality is established:

$$D > B \tag{2}$$

Although not shown in the drawings, similar to the first embodiment 100A, a tightening bolt (8) passes through in order the elongate opening 6*a*, the circular opening 7*a*, the other circular opening (7*b*) and the other elongate opening (6*b*), which are aligned. Furthermore, a lock lever (9), a nut (10) and washers (11*a* and 11*b*) are incorporated with the tightening bolt (8) in substantially same manner as the first embodiment 100A (see FIG. 2).

Thus, as is understood from FIG. 6, when, due to manipulation of the lock lever (9) in the fastening direction, the side walls 3*a* and (3*b*) of the upper clamp 3 are inclined toward each other, each side wall 3*a* (or 3*b*) of the upper clamp 3 can contact with both the jacket tube 2' and the modified distance bracket 12 without producing or leaving a gap between the side wall 3*a* (or 3*b*) and the cylindrical outer wall of the jacket tube 2'. That is, as is seen from the drawing, the practical distance "H" between the upper clamp 3 and the distance bracket 5 becomes small like in case of the above-mentioned first embodiment 100A, because each side wall 3*a* (or 3*b*) of the upper clamp 3 is evenly pressed against both the jacket tube 2' and the raised ridge 12*a* (or 12*b*) by the tightening bolt (8). Thus, a tight coupling is established between the upper clamp 3 and the distance bracket 12 like in case of the above-mentioned first embodiment 100A.

As will be understood from the foregoing description, in the first embodiment 100A of the present invention, the distance bracket 5 is so produced that the distance "C" between the upper ends of the side walls 5*a* and 5*b* thereof is substantially equal to the distance between the side walls 3*a* and 3*b* of the upper bracket 3 and greater than the distance "B" between the lower ends of the side walls 5*a* and 5*b*, and in the second embodiment 100B of the invention, the jacket tube 2 and the distance bracket 12 are so produced that the outer diameter "D" of the jacket tube 2 is substantially equal to the distance between the side walls 3*a* and 3*b* of the upper clamp 3 and greater than the distance "B" between the lower ends of the raised ridges 12*a* and 12*b* of the distance bracket 12. With such measures, the practical distance "H" between the upper clamp 3 and the distance bracket 5 or 12 becomes small, as has been mentioned hereinabove. Thus, tight coupling between the upper clamp 3 and the distance bracket 5 or 12 is established upon turning of the lock lever 9 in the fastening direction, as has been described hereinabove.

Although the invention has been described above with reference to certain embodiments of the invention, the invention is not limited to the embodiments described above. Various modifications and variations of the embodiments described above will occur to those skilled in the art, in light of the above teachings.

What is claimed is:

1. A tilt-lock device for a tilt-type steering column of a motor vehicle, comprising;
   a clamp adapted to be fixed to a body of said motor vehicle, said clamp being formed with spaced first side walls which define therebetween a recess for passing therethrough a jacket tube of the steering column;
   a distance bracket formed with spaced second side walls which support thereon said jacket tube, said distance bracket being slidably movably disposed between the first side walls of said clamp in such a manner that outer surfaces of said second side walls are in contact with inner surfaces of said first side walls;

openings formed in lower portions of said first and second side walls;

a fastening bolt passing through said openings and having a threaded leading end projected outside of one of said first side walls, said fastening bolt being suppressed from rotation about its axis relative to said first side walls;

a nut operatively engaged with said threaded leading end of the fastening bolt, said nut forcing said first side walls in incline toward each other when turned about said threaded leading end in a fastening direction; and means for lowering a possibility of producing a gap between each of said first side walls and each of said second side walls when said first side walls are forced to incline toward each other;

wherein said means comprises a structure of said distance bracket wherein when said distance bracket is applied with substantially no stress, the distance between upper ends of said second side walls is substantially equal to the distance between said first side walls and greater than the distance between lower ends of said second side walls.

2. A tilt-lock device as claimed in claim 1, in which the second side walls of said distance bracket are respectively formed with inwardly bent support portions for supporting and holding said jacket tube.

3. A tilt-lock device as claimed in claim 2, in which said inwardly bent support potions are welded to said jacket tube.

4. A tilt-lock device as claimed in claim 1 further comprising a lock lever which is secured to said nut to rotate therewith.

5. A tilt-lock device as claimed in claim 4, further comprising:

a washer operatively disposed between a head portion of said fastening bolt and the other of said first side walls, said head portion being projected outside of the other of said first side walls; and another washer operatively disposed between said nut and said one of said first side walls.

6. A tilt-lock device for a tilt-type steering column of a motor vehicle, comprising:

a clamp adapted to be fixed to a body of said motor vehicle, said clamp being formed with spaced first side walls which define therebetween a rectangular recess for passing therethrough a jacket tube of said steering column;

a distance bracket formed with spaced second side walls and inwardly bent support portions which support thereon said jacket tube, said distance bracket being slidably movably disposed between the first side walls of said clamp in such a manner that outer surfaces of said second side walls are in contact with inner surfaces of said first side walls;

elongate openings respectively formed in lower portions of said first side walls, which are aligned;

circular openings respectively formed in lower portions of said second side walls, which are aligned;

a fastening bolt passing through said elongate and circular openings and having a threaded leading end projected outside of one of said first side walls;

a nut operatively engaged with said threaded leading end of said fastening bolt, said nut forcing said first side walls to incline toward each other when turned about said threaded leading end in a fastening direction; and a lock lever fixed to said nut to rotate therewith, wherein when said distance bracket is applied with substantially no stress, the distance between upper ends of said second side walls is substantially equal to the distance between said first side walls and greater than the distance between lower ends of said second side walls.

* * * * *